June 18, 1957     B. R. BELLINGHAM     2,796,162
IMPLEMENT FOR PICKING UP AND ELEVATING
HAY BALES AND OTHER PACKAGES
Filed July 29, 1953     6 Sheets-Sheet 1

June 18, 1957     B. R. BELLINGHAM     2,796,162
IMPLEMENT FOR PICKING UP AND ELEVATING
HAY BALES AND OTHER PACKAGES
Filed July 29, 1953     6 Sheets-Sheet 5

United States Patent Office 2,796,162
Patented June 18, 1957

2,796,162

IMPLEMENT FOR PICKING UP AND ELEVATING HAY BALES AND OTHER PACKAGES

Bebb Ross Bellingham, Hamilton, New Zealand

Application July 29, 1953, Serial No. 371,020

Claims priority, application New Zealand August 12, 1952

11 Claims. (Cl. 198—9)

The invention relates to an implement for picking up and elevating bales of hay and other packages. As the implement of the invention has been devised mainly for the purpose of picking up and elevating hay bales, it will hereinafter be described in that connection.

The chief object of the invention is to provide an implement of simple construction and by the aid of which hay bales left lying on the ground as they are formed by a baling machine, or by a combined cutting and baling machine, can readily be picked up and brought to a position from which they can, with a minimum of labour, be transferred to a vehicle used for transporting them to a stacking or storing site, and can later be readily transferred from the vehicle to the stacking or storing site.

The implement according to the invention comprises a chassis having ground wheels, means for connecting the chassis to a transport vehicle, a pylon or column mounted on the chassis, a platform rotatably supported in an elevated position by the pylon or column, a jib structure connected for a luffing movement to the platform, an endless conveyor supported on the jib structure, and means for driving the conveyor.

The arrangement according to the invention is such that when the implement is connected to the side of the transport vehicle, the platform is rotated so that the jib structure lies substantially parallel to the side of the vehicle, the jib structure is luffed downwardly, so that its free end lies on or near the ground, the vehicle is moved forwardly over the ground and the conveyor is driven in the appropriate direction, the conveyor will act to pick up hay bales lying on the ground and carry them up to the platform from which they can be loaded on to the vehicle; while when the vehicle is stationary, the jib structure is luffed upwardly, the platform is rotated so that the jib structure extends away from the side of the vehicle and the conveyor is driven in the opposite direction, hay bales unloaded from the vehicle on to the platform can be engaged with the conveyor so that the latter acts to transfer them to a stack or storing site.

The implement may be wholly supported on ground wheels or there may be provided ground wheels at the rearward end of the chassis and skids or shoes at the forward end thereof.

The transport vehicle may be a mechanically propelled truck, or may be constituted by a trailer connected to a mechanically propelled truck or tractor.

Power for driving the conveyor in a direction for picking up hay bales and lifting them to the platform when the jib structure is in lowered position, and also for driving the conveyor in a direction for transferring bales from the platform to the stacking or storing site when the jib structure is in elevated position, may be obtained from a power unit mounted on the chassis of the implement and acting through suitable transmission mechanism which may include a clutch.

Preferably, power for driving the conveyor in the first mentioned is derived from a suitable driving connection, including a clutch, between the ground wheels of the implement. In that case, a power unit is provided on the chassis of the implement for driving the conveyor in the second-mentioned direction through transmission mechanism including a clutch.

Any suitable means may be provided for luffing and swivelling the jib structure. For luffing, at least one pivoted arm may be provided, and the implement may include chain and sprocket wheel or cable and winch arrangement operated by a hand-wheel for actuating the arm or arms. Swivelling may be effected by hand pressure, means being provided, if necessary, for holding the jib structure in its laterally adjusted position. For the swinging movement, however, use may be made of the power unit already provided for driving the conveyor in at least one direction, suitable clutch and transmission mechanism being included for the purpose. The possibility presents itself of using the power unit also for luffing the jib structure.

At the free end of the jib structure there may be provided a rotor acting to ensure that the bales will be picked up by the conveyor when the jib structure is in lowered position and the upper run of the conveyor is moving towards the platform. Such rotor may also act to ensure that the bales are released from the free end of the conveyor when the jib structure is in elevated position and the upper run of the conveyor is moving away from the platform.

At the end of the jib structure nearest the platform there may be provided a further rotor acting to ensure that the bales carried by the conveyor to the platform when the jib structure is in lowered position, will be released from the conveyor and pushed on to the platform or can readily be drawn on to the platform and manipulated for loading into the transport vehicle.

The aforementioned rotors are of particular value where the conveyor includes spikes or prongs acting to take hold of the bales.

The forward end of the chassis of the implement may be fitted with splayed guides acting to direct the bales to the conveyor during the picking up process, and such guides may be foldable so that they can be moved out of the way when it is desired to tow the implement after it has been detached from the transport vehicle, or the guides may be so shaped and mounted that their ends can be brought together to provide a towing or draw-bar hitch enabling the implement to be towed along roads to the place of use.

The jib structure may support a superimposed guide which acts to prevent the bales from tumbling during the transfer process.

The platform may be provided with means acting to deflect the bales towards the transport vehicle as they are received by the platform from the conveyor during the picking up process. Such deflecting means may be so constructed that it can be moved out of the way of the platform during the unloading of the transport vehicle.

The platform will usually be so positioned that it lies above the load-carrying floor or tray of the transport vehicle, thereby making it easy to move the bales from the platform on to the vehicle. Means may be provided for adjusting the position of the platform in elevation.

In order that the invention may be more readily understood and carried into practical effect, reference is now made to the accompanying drawings which illustrate one exemplification of an implement constructed in accordance with the invention.

It may here be explained that, owing to the prescribed limitations on the sizes of sheets on which drawings must be made, certain of the figures of the accompanying drawings are drawn in two parts in order to avoid the use of an excessively small scale, the two parts being bracketed together and the planes of division being indicated by vertically disposed dot-and-dash lines.

Figure 3:
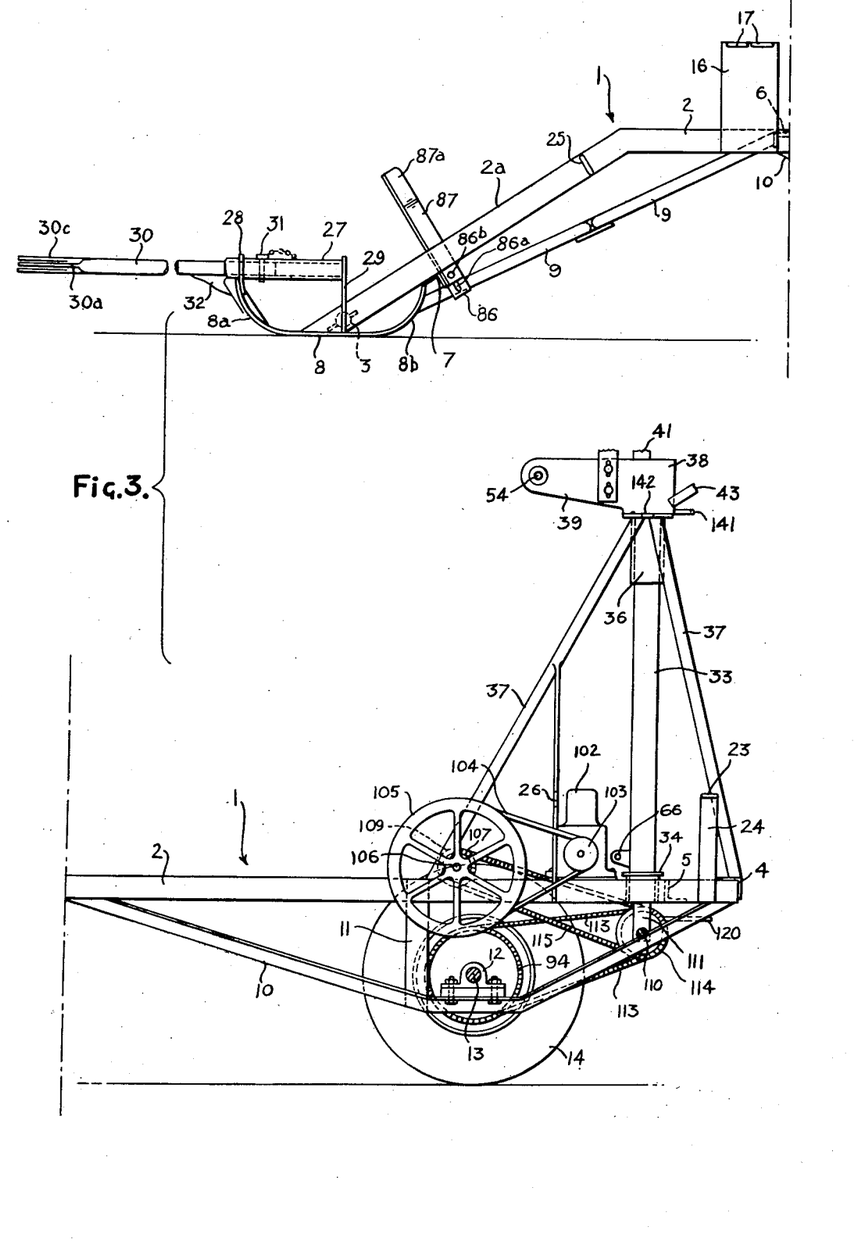
Figure 3 is a side elevational view of the chassis of the implement, certain parts being omitted for clarity of illustration.
Figures 4, 5:
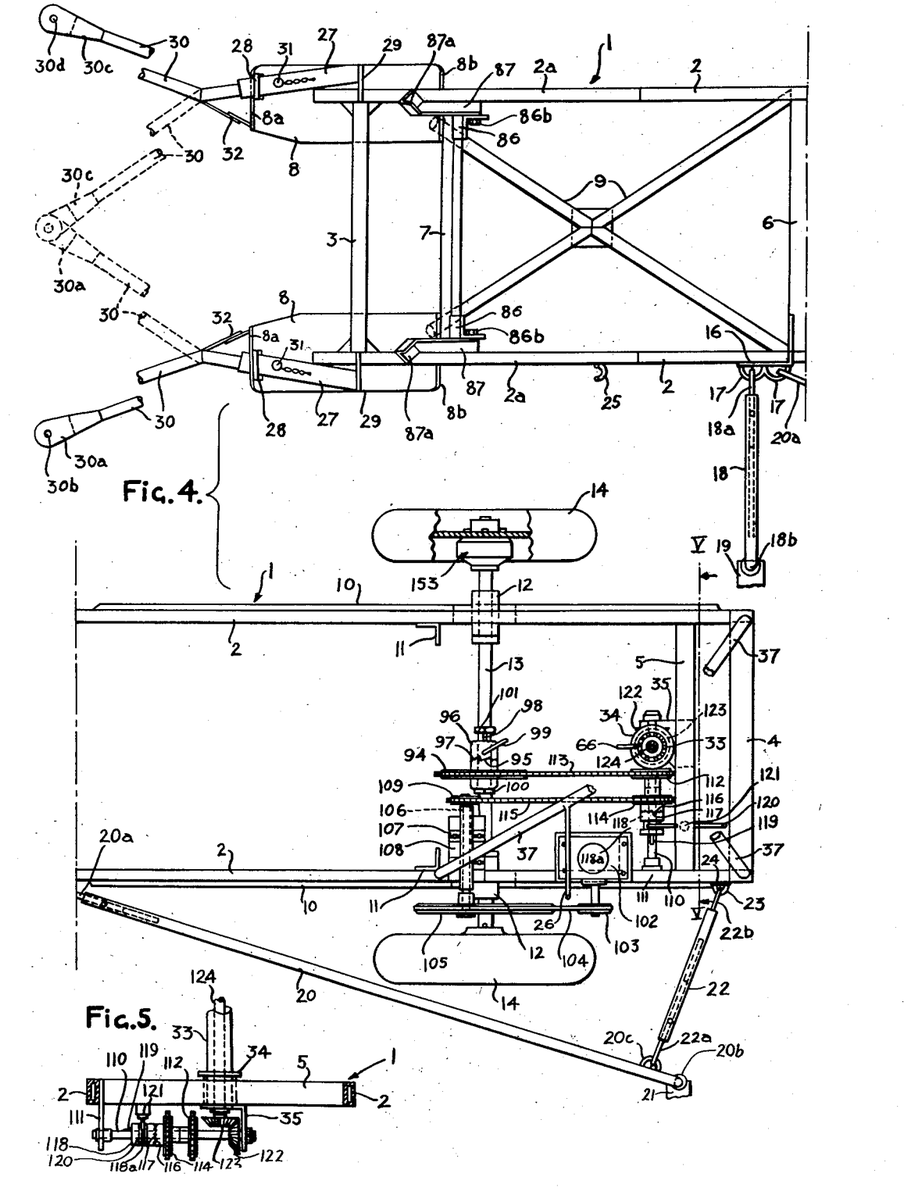
Figure 4 is a plan view of the chassis.
Figure 5 is a cross-sectional view of part of the chassis, the view being taken on the line V—V of Figure 4.
Figures 6, 7, 8, 9:
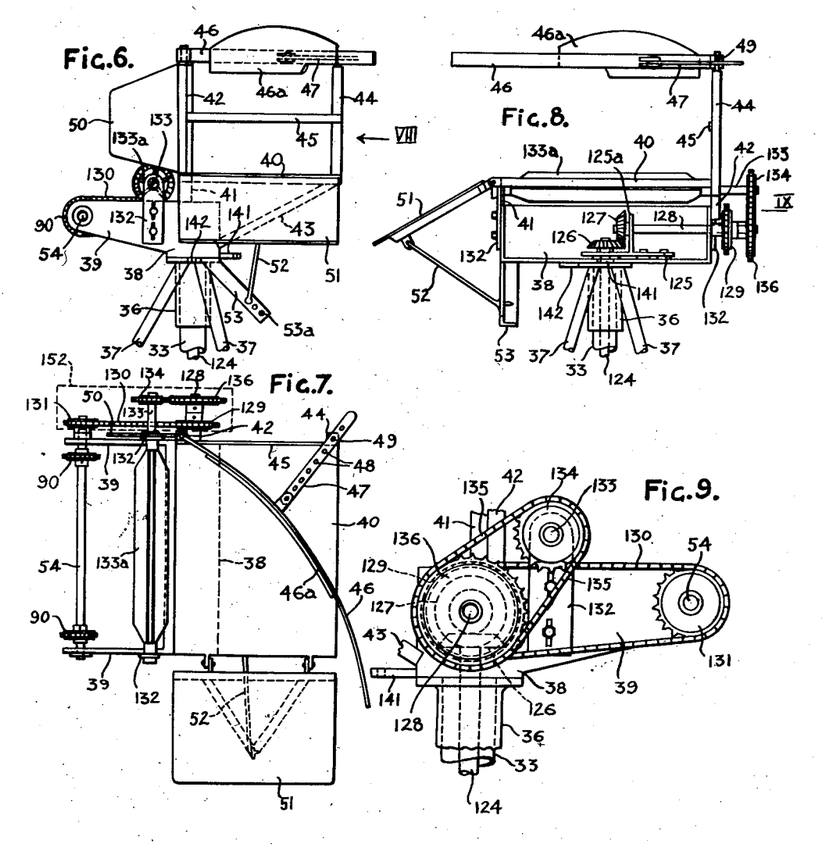
Figure 6 is a side elevational view of the platform of the implement.
Figure 7 is a plan view of the platform.
Figure 8 is a rear end view of the platform (looking in the direction of the arrow VIII in Figure 6)
Figure 9 is a side elevational view to an enlarged scale of part of the platform, looking in the direction of the arrow IX in Figure 8.

As illustrated more particularly in Figures 3, 4 and 5, the chassis generally indicated at 1, comprises two parallelly arranged longitudinal frame members 2 the forward end portions of which are bent downwardly as indicated at 2a. The longitudinal members 2 are joined near their forward ends by a tubular transverse member 3 and at their rearward ends by a transverse member 4 of angle-iron. Further strength is provided by a transverse member 5 of angle-iron arranged forwardly of and near the member 4, by a transverse member 6 of angle-iron arranged approximately midway between the ends of the longitudinal members 2 and by a further transverse member 7 of angle-iron arranged rearwardly of and near the member 3.

Shoes 8 are secured to the forward end of the longitudinal members 2, that is to say, to the free ends of the downwardly bent portions 2a of these members. The shoes 8 are adapted to rest on and slide over the ground when the implement is hauled along, and are formed with upwardly curved forward and rearward end portions as indicated at 8a and 8b respectively, so that a smooth sliding action is assured even when the ground surface is irregular.

The downwardly bent forward end portions 2a of the longitudinal members 2 are reinforced by diagonally arranged bracing tubes 9 the forward ends of which are joined to the upwardly curved rearward end portions 8b of the shoes 8, while the rearward ends of the tubes are joined to the transverse member 6.

The rear portions of the longitudinal members 2 carry sub-frame members 10 which are joined to the members 2 near the transverse member 6, then extend downwardly and rearwardly and then extend upwardly and further rearwardly and are joined to the rear ends of the members 2, the sub-frame members 10 being stiffened by vertically disposed stays 11 extending between the said members and the longitudinal members 2, the sub-frame members carry bearing bushes 12 in which a live axle 13 is journalled for rotation, the outer end portions of the axle being fitted with ground wheels 14.

Figure 1:
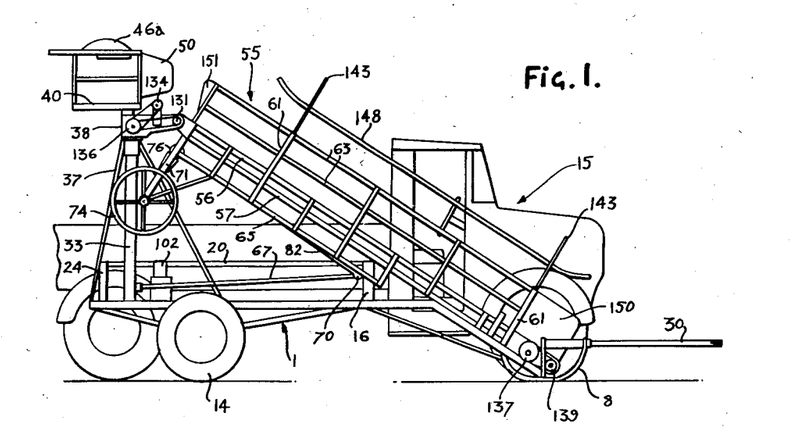
Figure 1 is a simplified side elevational view showing the implement connected to the side of a transport vehicle, with the jib structure in lowered position ready for the picking up step.
Figures 2, 15:
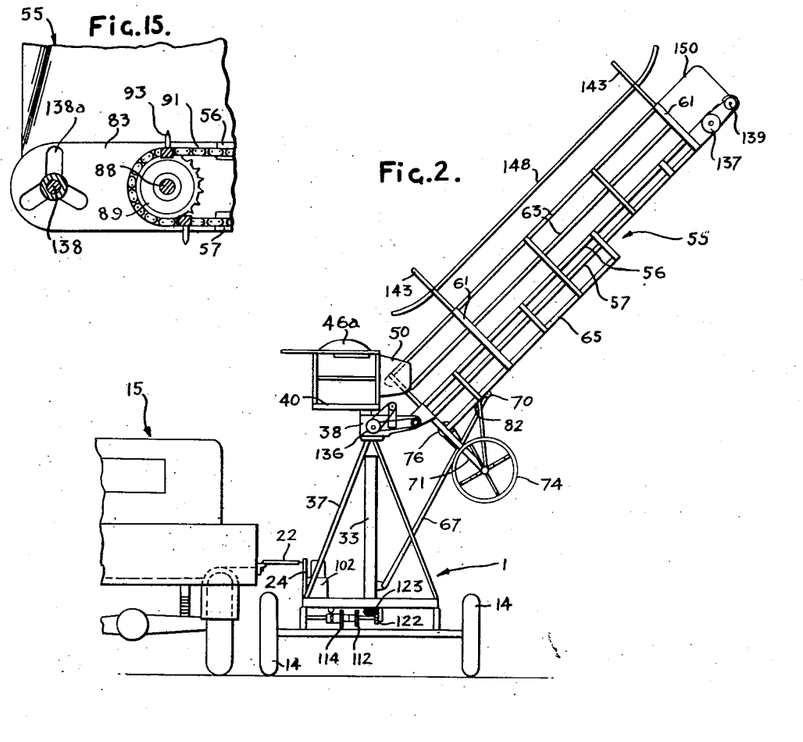
Figure 2 is a rear end view corresponding to Figure 1, but showing the jib structure in raised position and extending away from the side of the vehicle ready for the unloading step.
Figure 15 is a sectional view on the line XV—XV of Figure 14.

To enable the chassis 1 to be connected to the side of a transport vehicle indicated generally at 15 in Figures 1 and 2, there is secured to one of the frame members 2, in the locality of the transverse member 6, an upwardly directed plate 16 carrying two eyes 17. With one of these eyes there is engaged an eye 18a on one end of a tie-rod 18 (Figure 4), the other end of which is bent downwardly as indicated at 18b for engagement in a socket in a bracket 19 secured to one side of the vehicle 15, the portion 18b of the tie-rod being formed with a hole in which can be engaged a cross pin for retaining the said portion in the socket. With the other one of the two eyes 17 there is engaged an eye 20a on one end of a second tie-rod 20 the other end of which is bent downwardly as indicated at 20b for engagement in a socket in a bracket 21 secured to the same side of the vehicle 15 but at a point situated to the rear of the bracket 19, the portion 20b of the tie-rod 20 being formed with a hole for insertion of a cross-pin acting to retain the portion 20b in the socket. Near the downwardly bent portion 20b of the tie-rod 20 there is provided an eye 20c in which engages a hook 22a on one end of a stretcher-bar 22 the other end of which is provided with an eye 22b engaged in an eye 23 carried by a plate 24 secured to one of the longitudinal members 2 at a point situated near the rear end thereof.

When the tie-rods 18 and 20 are not required for use, the tie-rod 18 can be folded against the side of the chassis 1 and supported in a bracket 25 secured to the adjacent longitudinal member 2, while the hook 22a on the stretcher bar 22 can be disengaged from the eye 20c on the tie-rod 20, permitting both this tie-rod and the stretcher-bar to be folded against the same side of the chassis and supported in a bracket 26 carried by the chassis.

The tie-rod 18 and the stretcher-bar 22 may be adjustable for length.

The forward end of the chassis 1 is provided with splayed guides acting to direct hay bales into the space between the shoes 8 when the implement is hauled over the ground. To this end there are provided forwardly directed sockets 27 which are secured to the upwardly curved forward ends of the shoes 8 by means of brackets 28 and also to vertically disposed plates 29 secured to the base of the shoes and to the longitudinal members 2. These sockets slidably and rotatably receive the rearward end portions of guide tubes 30 which are bent so that they normally splay away from each other. The tubes 30 are held in the socket 27 by means of removable but captive pins 31. The forward end portion of one of the guide tubes 30 is flattened as indicated at 30a and formed with a hole 30b, while the forward end portion of the other guide tube is bifurcated as indicated at 30c and formed with a hole 30d, the guide tubes 30 being bent to such an extent that while their forward end portions normally diverge from each other, when the pins 31 are removed and the guide tubes are rotated in the sockets 27 by 180°, the flattened end portion 30a of one of the tubes can be engaged in the bifurcated end portion 30c of the other tube as indicated in dotted lines in Figure 4, whereupon the pins 31 can be reengaged and a coupling pin can be inserted in the registering holes 30b and 30d thereby enabling the guide tubes to be used as a draw bar facilitating towage of the implement through a gateway or along a road or into an implement shed when it is not connected to the transport vehicle 15.

To prevent the bales becoming jammed against the forward end portions of the shoes 8 when the guide tubes 27 are in their normal operative positions, there are provided releasable straps 32 extending between the forward end portions of the shoes and the bends of the guide tubes.

The chassis 1 supports near its rear end a vertically disposed rotatable column 33. The column is of tubular form and the lower end portion thereof is engaged rotatably in a socket 34 secured to the transverse member 5 of the chassis 1 by means of a bracket 35 (Figures 4 and 5). The upper end portion of the column 33 is rotatably engaged in a flanged socket 36 (Figures 3, 6, 8 and 9) which is supported in elevated position by means of three inclined stays 37 all connected to the flange of the socket 36 and two of which are joined to the extremities of the transverse member 4 of the chassis, while the third is joined to one of the longitudinal members 2 in the locality of one of the stays 11.

The upper end of the column 33 is joined to an elongated box 38 (Figures 3 and 6 to 9) which rests for rotation on the flange of the socket 36, and is formed with a pair of forwardly projecting arms 39. Above the box 38 there is arranged a platform 40 (Figures 6 to 8) which overhangs the box in a rearward direction, the platform being secured to and supported from the box by means of a bracket 41 at one of its two forward corners and by means of a post 42 at the other forward corner. Thus, when the column 33 is rotated, the box 38 and platform 40 will rotate with it. Additional support for the platform 40 is afforded by stays 43 (Figure 6) extending from the box 38 to the rear edge of the platform.

The platform 40 is so arranged that two opposite edges thereof extend in the direction of the length of the box 38, while the remaining two opposite edges lie in the same general plane as the arms 39 on the box. The part 42 extends upwardly from the platform 40 and at one of the rear corners opposite the corner carrying this post the platform is provided with a post 44, the two posts being braced together by means of a rail 45. Upon the upper end of the post 42 there is pivotally mounted a curved arm 46 carrying a deflector plate 46a of arcuate shape in plan with its concave face lying nearest the arms 39 of the box 38. The deflector plate 46a extends across the platform 40 generally in a direction towards the corner thereof which is diagonally opposite the corner carrying the post 42. The exact position of the deflector plate across the platform can be adjusted by swinging the arm 46 about the axis of the post 42 and holding it in adjusted position by means of a bar 47 which is pivotally connected to the convex side of the arm 46 and is formed with a series of holes 48 (Figure 7) any selected one of which is engaged over a pin 49 on the upper end of the post 44.

Besides supporting the arm 46, the post 42 also carries a guide plate 50 which extends in the same general direction as one of the arms 39 on the box 38.

To that edge of the platform 40 opposite the edge carrying the posts 42 and 44 there is hinged a downwardly inclined flap 51 the angle of which can be adjusted by means of a stay 52 one end of which is pivotally connected to the underside of the flap while the other end is adapted to be engaged in a selected one of a series of holes 53a formed in an arm 53 secured to and depending from the box 38.

The purposes for which the deflector plate 46a, guide plate 50 and hinged flap 51 are provided, will be explained later.

The outer ends of the arm 39 in the box 38 are perforated to receive bushes in which a shaft 54 is journalled for rotation. This shaft, besides serving another purpose to be explained later, acts as a fulcrum for a jib structure generally indicated at 55 in Figures 1 and 2 and 10 to 15.

The jib structure 55 comprises two pairs of parallelly arranged track rails, there being in each pair an upper rail 56 and a lower rail 57 held in spaced relationship by means of stay-plates 58, rods 59, posts 60, and tubes 61, all joined to the two rails and arranged at right-angles thereto. The pair of rails 56 and 57 along one side of the jib structure are held at the required distance apart from the corresponding pair of rails at the other side of the structure by means of cross-bars 62, Figures 10 and 11 joined to the stay-plates 58 and posts 60.

The posts 60 and tubes 61 are prolonged above the two upper rails 56 and are joined by longitudinally extending bars 63 so as to form fencing lying above the rails 56 at each side of the jib structure. The purpose of this fencing will be explained later.

At the rear end of the jib structure, each pair of rails 56 and 57 is joined to a lug 64 which is formed with a hole through which the shaft 54 freely passes so that the jib structure 55 can be swung upwardly and downwardly about a fulcrum provided by this shaft. In other words, by reason of the pivotal connection of the lugs 64 to the shaft 54, the jib structure 55 is connected for a luffing movement to the arms 39 of the box 38 which forms part of the assembly including the platform 40 carried by the upper end of the column 33. Moreover, by reason of the fact that the jib structure is connected to the platform assembly, rotation of the latter with the column 33 will cause the jib structure to execute a swivelling movement about the axis of the column.

The lugs 64 are joined by a transverse member 64a which, in addition to the bars 62, acts as further bracing for the pair of rails 56 and 57 at each side of the jib structure.

Figure 16:
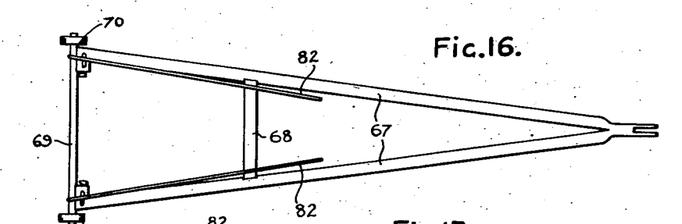
Figures 16 and 17 are, respectively, a plan view and a side view illustrating part of the means employed for luffing the jib structure.
Figure 17:
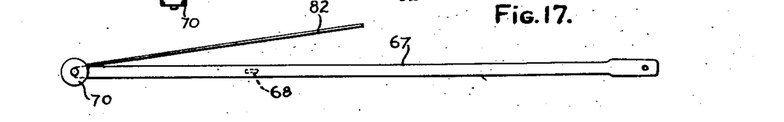

The rods 59 extend below the bottom rails 57 and provide supports for longitudinally extending runner bars 65 (Figure 10) forming part of means employed for luffing the jib structure 55. The column 33 is provided near its lower end with a lug 66 (Figures 3 and 4) to which is pivotally connected the rearwardly joined ends of a pair of diverging arms 67 (Figures 16 and 17) the angle between which is determined by a transverse stay 68. The outer ends of the arms 67 are joined to a transversely disposed shaft 69 the outer end portions of which carry rollers 70 engaging with the track runners 65. Thus, when the arms 67 are swung upwardly, they will act to luff the jib structure in an upward direction, while when the arms swing downwardly, they will allow the jib structure to luff in a downward direction.

For operating the arms 67 there is provided a bracket 71 which is secured to one pair of the rails 56 and 57 and to one of the track bars 65 near the inner end of the jib structure 55, and which projects below the said track bar, the bracket being reinforced by an inclined stay 72 joined to the lower end of the bracket and to the adjacent track bar. In the lower end portion of the bracket 71 there is journalled for rotation a spindle 73 to the outer end of which there is secured a hand-wheel 74, while a sprocket wheel 75 (Figure 10) is keyed to the inner end of this spindle. Near its upper end, the bracket 71 supports one end portion of a rotatable shaft 76 the other end portion of which is journalled for rotation in a second bracket 77 connected to the pair of rails 56 and 57 opposite those to which the bracket 71 is connected. To the shaft 76 there is keyed a sprocket wheel 78 arranged in alignment with the sprocket wheel 75 on the spindle 73, and with these two wheels there is engaged an endless driving chain 79. To the end of the shaft 76 adjacent the bracket 71 there is keyed a ratchet wheel 80 the teeth of which are engaged by a spring controlled pawl 81 supported for pivotal movement on the bracket 71.

The shaft 76 acts as a winch or winding roller and, for this purpose, there is secured to it one end of each of two wire ropes 82 the other ends of which are anchored to the shaft 69 near the outer ends of the arms 67. The shaft 69 besides acting as a support for the rollers 70 and as an anchorage for the ropes 82, also acts to keep the outer ends of the arms 67 at the correct distance apart.

Figures 10, 12:
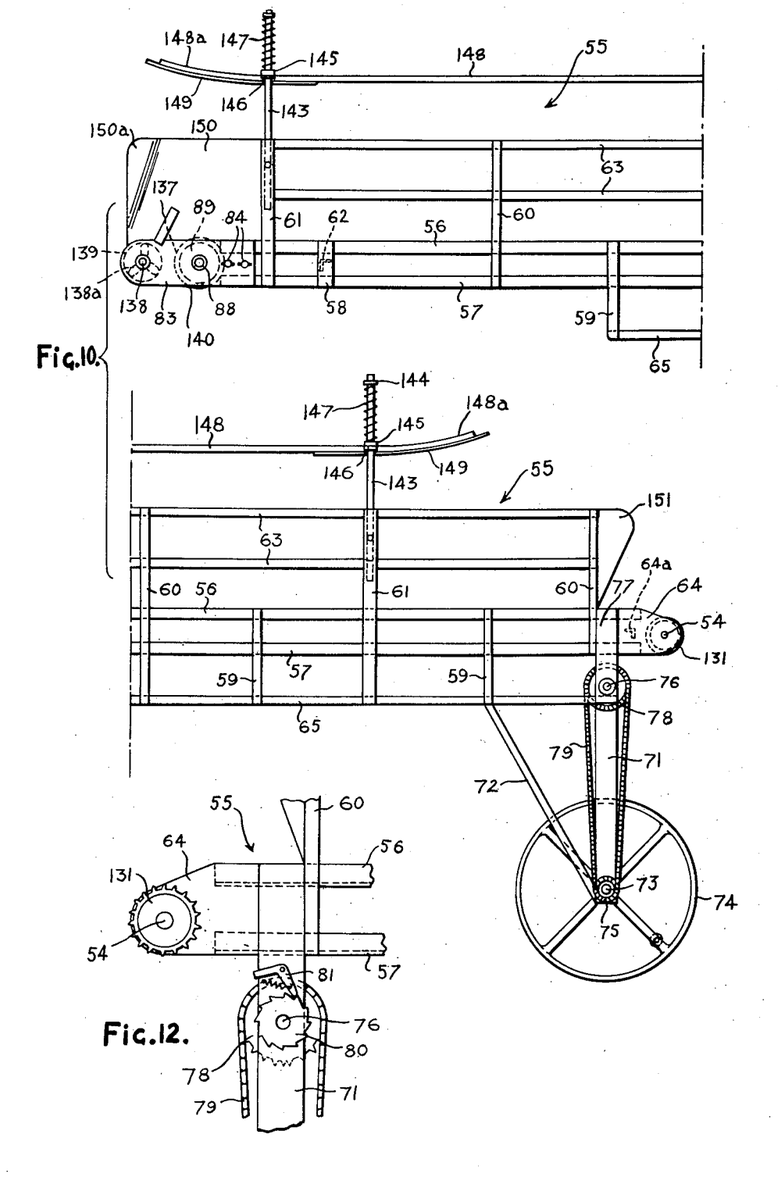
Figure 10 is a side elevational view of the jib structure of the implement, certain parts being omitted to avoid confusion.
Figure 12 is a side view to an enlarged scale of parts of the jib structure, the view being taken on the line XII—XII of Figure 11.

With the arrangement described in the foregoing, when the hand wheel 74 is rotated anticlockwise as viewed in Figure 10 (clockwise as viewed in Figure 12), the shaft 76 will be rotated in a direction for winding the ropes 82 thereon. The ropes will thus exert a pull on the outer end of the arms 67, causing these to swing upwardly so that the rollers 70 apply an upward thrust to the track runners 65 and thus cause the jib structure 55 to be luffed upwardly. The teeth of the ratchet wheel 80 are so directed and the pawl 81 is so arranged that these parts permit the hand-wheel 74 to be freely rotated in a direction for causing the jib structure to be luffed upwardly, but restrain the structure against downward movement. When this latter movement is desired, the hand-wheel 74 is gripped, the pawl 81 moved to releasing position, and the hand-wheel is then allowed to rotate gently in a clockwise direction as viewed in Figure 10 (anti-clockwise in Figure 12), so that the ropes 82 are payed out from the shaft 76. Thus, the arms 67 are free to swing downwardly and the jib structure, by following the movement of the arms under its own weight, executes a downward luffing movement.

The winch shaft 76 being of relatively small diameter, has a low gear ratio so that when the pawl 81 is released from the ratchet wheel 80, and the shaft 76 rotates to pay out the ropes 82, the jib structure is checked against downward luffing movement at excessive speed. In any case, the speed of such descent can be controlled by application of pressure to the hand-wheel 74. Conversely, the sprocket wheel 78 on the shaft 76 is of large diameter compared with the diameter of the sprocket wheel 75 on the hand-wheel spindle 73, so that the jib structure can be luffed in an upward direction by rotating the hand-wheel without the need for excessive exertion.

When the jib structure 55 is in fully lowered position, it is intended that it should lie in registering alignment with the chassis 1 and that its outer end shall be supported from the chassis. In fulfillment of this intention, forwardly projecting plates 83 are adjustably secured to the forward end portions of the pairs of rails 56 and 57 by means of bolts passing through slots in the plates and engaged with the ends of a transverse member 85 (Figures 11 and 13) secured to the rails 56 and 57, these plates 83 being adapted to rest on stops 86 (Figures 3 and 4) provided on the chassis 1 at positions situated adjacent the ends of the transverse member 7. To guide the jib structure into correct registering position relatively to the chassis when it approaches its fully lowered position, upwardly directed arms 87 are secured to the downwardly bent portions 2a of the members 2 and also to the transverse member 7, the upper end portions of these arms being splayed outwardly as indicated at 87a so as to engage with the rails 56 and 57 when the jib structure is approaching its lowered position, and thereby to direct the jib structure into a central position relatively to the chassis should the structure be slightly out of alignment with the latter before its outer end comes to rest on the stops 86. The arms 87 also serve to restrain the outer end of the jib structure against lateral displacement relatively to the chassis when the structure is in fully lowered position.

In the embodiment illustrated the stops 86 are shown to be formed with slots 86a (Figure 3) through which pass securing bolts 86b engaged with the lower end portions of the arms 87, this arrangement enabling the stops to be adjusted upwardly or downwardly, so that the distance at which the outer end of the jib structure 55 lies above the ground when the structure is in fully lowered position and rests on the chassis 1 can be varied.

The plates 83 at the forward end of the jib structure are bushed to form bearings for a transversely disposed shaft 88 to which are secured chain wheels 84 lying in alignment with the rails 56 and 57. To the shaft 54 passing through the lugs 64 at the rearward end of the jib structure there are secured chain wheels 90 (Figure 11) also arranged on alignment with the rails 56 and 57. With the chain wheels 89 and 90 there are engaged endless chains 91 the upper runs of which are supported by the rails 56, while the lower runs are supported on the rails 57. The chains are joined together at intervals in spaced relationship by stretcher bars 92 (Figures 13 to 15) which are fitted with prongs or tines 93, the latter being so arranged that, in the upper run of the chains they project upwardly, while, in the lower run of the chains they project downwardly. The chains 91, stretcher bars 92 and prongs 93 together constitute an endless conveyor supported by and forming part of the jib structure 55.

The plates 83 at the forward end of the jib structure 55 are adjustably secured in position so as to allow any excessive slackness in the conveyor chains 91 to be taken up.

In the embodiment illustrated, the arrangement is such that when the chassis 1 is hitched to the side of the transport vehicle 15, the jib structure 55 is in lowered position so that its forward end is supported upon the stops 86 on the forward end portion of the chassis 1, and the transport vehicle is driven forwardly, the conveyor will be driven suchwise that its upper run will move towards the platform 40 while, when the vehicle 15 is at a standstill and the jib structure is luffed upwardly, the conveyor can be driven suchwise that its upper run will move away from the platform. Means for driving the conveyor in the two directions will now be described.

On the live axle 13 supporting the ground wheels 14 of the chassis 1, there is freely mounted a main drive sprocket wheel 94 (Figures 3 and 4), one end of the hub of this wheel being formed with ratchet or dog teeth 95. The live axle 13 also supports a sleeve 96 one end of which is formed with ratchet teeth 97 adapted to co-operate with the teeth 95. The sleeve 96 is formed with a key-way in which engages a key 98 on the axle 13, the arrangement being such that while the key causes the sleeve to rotate with the axle, the sleeve is movable axially so that the teeth 97 thereon can be brought into and out of engagement with the teeth 95 on the hub of the main drive sprocket wheel 94. For locking the sleeve in its operative or inoperative position, it is provided with a screw-threaded locking and operating arm 99 engaged in a screw-threaded hole in the sleeve. By rotating the locking arm 99 the inner end thereof can be brought into gripping engagement with the key 98 or axle 13. It will be understood that when the sleeve 96 is moved by means of the arm 99 so as to bring its teeth 97 into engagement with the teeth 95 on the hub of the main drive sprocket wheel 94, the latter will be in driven connection with the axle 13, while when the sleeve is moved in the opposite direction, the wheel 94 will be free of driving influence from the axle. The wheel 94 is located at correct position along the axle 13 by a collar 100 secured to the axle, while the extent to which the sleeve 96 can be moved away from the wheel 94 is limited by a collar 101 also secured to the axle.

The chassis 1 supports a power unit 102 shown to be constituted by an internal combustion engine, the output shaft of which is fitted with a pulley 103. Over this pulley passes a drive belt 104 which also engages with a pulley 105 on a transversely disposed countershaft 106 journalled for rotation in bearings 107 in a supporting plate 108 which is secured to the chassis in a position situated forwardly of the column 32. The bearings 107 are mounted for adjustment on the plate 108 so as to permit the tension of the drive belt 104 to be adjusted and to enable any excessive slackness developing therein to be taken up. To the countershaft 106 there is secured a sprocket wheel 109.

To the rear of the countershaft 106 there is provided a transversely disposed lay-shaft 110 supported for rotation by the bracket 35 secured to the transverse member 5 of the chassis 1 and by a further bracket 111 secured to one of the longitudinal members 2 of the chassis, the lay-shaft being arranged in coincidence with the axis of the column 33. To the lay-shaft 110 there is secured a sprocket wheel 112 arranged in line with the main drive sprocket wheel 94, an endless driving chain 113 being engaged with these two wheels. Upon the lay-shaft 110 there is mounted for independent rotation a sprocket-wheel 114 arranged in line with the sprocket wheel 109 on the countershaft 106, an endless driving chain 115 being engaged with these two wheels. One end of the hub of the sprocket wheel 114 is formed with ratchet or dog teeth 116 with which we adapted to co-operate ratchet or dog teeth 117 on a collar 118 mounted on the lay-shaft. The collar 118 has a key-way in which engages a key 119 on the lay-shaft so that while the collar is compelled to rotate with the lay-shaft it can be moved axially along the shaft so as to bring its teeth 117 into or out of mesh with the teeth 116 on the hub of the sprocket wheel 114. For operating the collar 118 there is provided a lever 120 which is pivoted supported between its ends, as indicated at 121, from the transverse member 5 of the chassis 1, one end portion of the lever being forked for engagement in a groove 118a in the collar 118 while the other end portion constitutes a hand-grip. Spring pressed means (not shown) may be provided in association with the lever 120 for holding the collar 118 in its operative or inoperative position.

To the lay-shaft 110 there is secured a bevel pinion 122 in mesh with a bevel pinion 123 secured to the lower end of a shaft 124 which passes upwardly through the centre of the column 33. The lower end portion of the shaft 124 is journalled for rotation in a bearing bush carried by the bracket 35 while the upper end portion of the shaft projects into the box 38 and is journalled for rotation in a bearing bush carried by a plate 125 (Figure 8) secured to the base of the box. To the upper end of the shaft 124 there is secured a bevel pinion 126 in mesh with a bevel pinion 127 secured to one end of a horizontally disposed shaft 128 which projects through one side of the box 38. The shaft 128 is arranged transversely with respect to the jib structure 55 and is journalled for rotation in a bearing bush carried by an upward extension 125a of the plate 125 and in a bearing bush in the aforesaid side of the box 38.

To the outer end portion of the shaft 128 there is secured a sprocket wheel 129 with which is engaged a drive chain 130, which is also engaged with a sprocket wheel 131 secured to an end portion of the shaft 54 projecting from one of the arms 39 on the box 38.

At a point situated between the shafts 54 and 128, the arms 39 on the box 38 carry upwardly directed brackets 132 in which is journalled for rotation a traversely disposed shaft 133 formed with longitudinally extending rotor blades 133a. One end portion of the rotor shaft 133 projects outwardly of one of the brackets 132, and to this position there is secured a sprocket wheel 134 engaged by an endless driving chain 135 which is also engaged with a further sprocket wheel 137 secured to the projecting portion of the shaft 128. The function served by the rotor blades 133a will be explained later.

Figure 11:
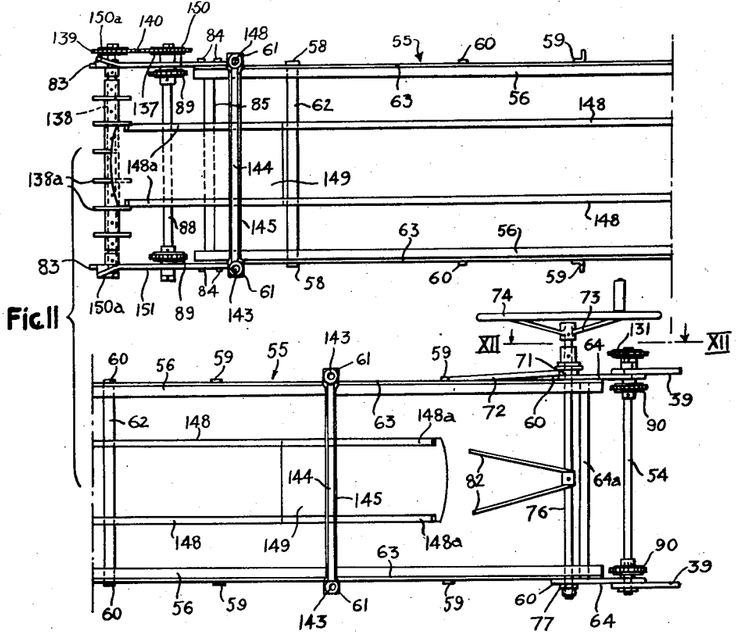
Figure 11 is a plan view of the jib structure, the conveyor being omitted for clarity of illustration.
Figure 13:
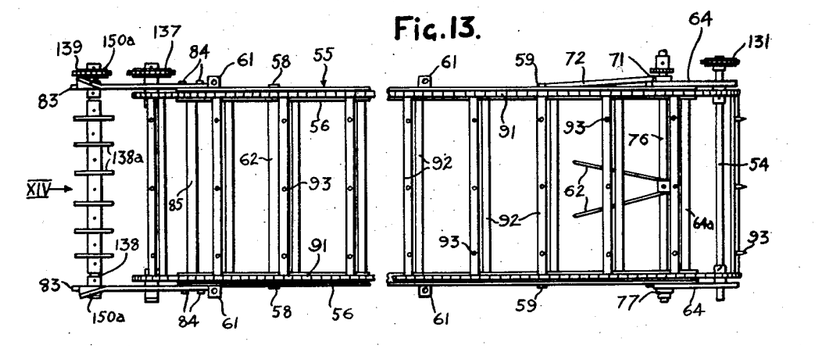
Figure 13 is a plan view of the jib structure including the conveyor thereon; the upper part of the structure being omitted.
Figure 14:
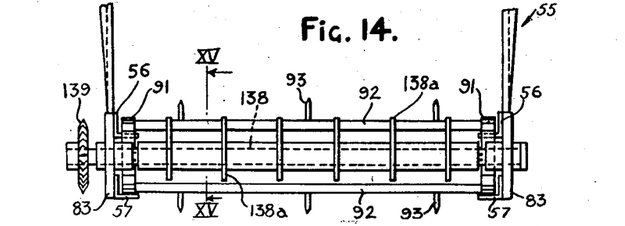
Figure 14 is a front end view of the jib structure to an enlarged scale looking in the direction of the arrow XIV in Figure 13.

An end portion of the shaft 88 carried by the plates 83 at the forward end of the jib structure 55 projects laterally beyond one of these plates and to this portion there is secured a sprocket wheel 137 (Figures 10, 11 and 13). At a position situated forwardly of the shaft 88 the plates 83 support a rotatable shaft 138 to which is secured a series of radially projecting rotor arms 138a. An end portion of the shaft 138 projects laterally beyond one of the plates 83 to agree with the projecting portion of the shaft 88, and to the said projecting portion of the shaft 138 there is secured a sprocket wheel 139 arranged in line with the sprocket wheel 137, an endless driving chain 140 (Figures 10 and 11) being engaged with both these wheels. The function served by the rotor arms 138a will be explained later.

The implement illustrated includes a number of parts to which reference has so far not been made. These parts will be referred to in the course of describing, in the following, how the implement is used:

The chassis 1 is secured to the side of the transport vehicle 15 by engagement of the outer ends of the tie-rods 18 and 20 in the brackets 19 and 21, so that the chassis is in parallelism with the vehicle and the forward end of the chassis corresponds to the forward end of the vehicle.

The jib structure 55 is luffed downwardly so that its forward end is supported on the chassis 1, the jib structure thus being positioned so that it extends upwardly, and rearwardly towards the platform 40 with its forward end lying close to the ground.

To pick up bales lying on the ground, the collar 96 on the live axle 13 is moved along the axle so that its teeth 97 engage with the teeth 95 on the hub of the main drive sprocket 94, a driving connection thus being established between the axle 13 and the said sprocket. At the same time, the collar 118 is moved along the lay-shaft 110 by means of the hand-lever 121 so that the teeth 117 thereon are brought out of engagement with the teeth 116 on the hub of the sprocket wheel 114, this wheel thus being brought into driven connection with the lay-shaft.

The transport vehicle 15 is now driven forward, taking the implement with it. This results in the conveyor 91, 92, 93 on the jib structure 55 being driven in such a direction that its upper arm moves towards the platform 40, this direction of drive being transmitted to the conveyor from the main drive sprocket 94 through the drive chain 113, sprocket wheel 112, lay-shaft 110, bevel wheels 122 and 123, shaft 124, bevel wheels 126 and 127, shaft 128, sprocket wheel 129, drive chain 130 sprocket wheel 131, shaft 54 and chain wheels 90.

Rotation of the shaft 54 to cause the conveyor to be moved in the direction stated, also causes the sprocket wheel 136, chain 135 and sprocket wheel 134 to drive the rotor shaft 133 in such a direction that the rotor blades 133a as they approach the upper part of the shaft, are caused to move away from the upper run of the conveyor towards the platform 40.

Movement of the conveyor in the direction stated also causes rotation of the shaft 88 and its chain wheels 89 over which pass the chains 91 of the conveyor at the lower and forward end of the jib structure. The shaft 88, acting through the sprocket wheel 137 and drive chain 140, causes the shaft 138 to rotate in such a direction that the rotor arms 138a, as they approach the upper part of the shaft, move towards the upper run of the conveyor.

During its forward movement the transport vehicle 15 is steered so that the guide tubes 30 at the forward end of the chassis 1 receive between them a bale lying on the ground and, in conjunction with the straps 32, serve to guide the bale so that it is brought into engagement with the rotor blades 138a on the shaft 138. These blades act to tilt the bale so that, as the transport vehicle and implement continue to move forwards, the prongs 93 of the conveyor come into engagement with the bale and the conveyor thus acts to carry the bale upwardly and rearwardly towards the platform 40.

As the bale approaches the platform 40 it is engaged by the rotor blades 33 of the rotor shaft 133a and these blades serve the two-fold purpose of ensuring not only that the bale is disengaged from the prongs 93 of the conveyor but also that the bale is propelled on to the platform.

As the bale passes on to the platform 40, the plate 46a acts to deflect the bale towards the edge of the platform lying nearest the tray of the transport vehicle 15, the degree of deflection being such as to cause the bale to tumble of its own accord from the platform on to the tray of the vehicle, or at least as to cause the bale to overhang the platform so that it can easily be pulled from the latter on to the tray.

The hinged flap 51 is set to extend downwardly towards the tray of the transport vehicle, and assists in directing the bale into the tray so that there is no risk of it falling into the space between the implement and the vehicle.

Further bales are picked up, conveyed to the platform 40 and transferred to the tray of the transport vehicle as the latter, in combination with the implement, is further driven over the ground.

When the tray of the transport vehicle has been loaded sufficiently, the vehicle is halted and the collar 96 on the live axle 13 is moved to a position in which its teeth 97 are brought out of mesh with the teeth 95 on the hub of the main drive sprocket wheel 94. Thus, the conveyor on the jib structure no longer has any driving connection with the axle 13 of the chassis 1, so that the conveyor remains stationary while the combination of vehicle and implement is driven to the storage or stacking site.

When the storage or stacking site is reached, the transport vehicle is halted, whereupon the hand-wheel 74 is rotated so as to cause the jib structure 55 to be luffed upwardly to the desired extent. The jib structure and platform 40 are now swivelled by hand about the axis of the column 33 so that the jib structure projects laterally from the side of the transport vehicle, the edge of the platform most remote from the rotor 133, 133a then lying nearest the vehicle. The deflector plate 46a is now swung to one side and secured, so that it lies clear of the platform. This position of the parts is depicted in Figure 2, the outer end of the jib structure being shown to be at a higher elevation than the end nearest the platform.

The jib structure may be held in its laterally projecting position by engagement of its outer end portion with a partly formed stack or with the step of a doorway opening into a storage loft. Preferably, however, and as shown in Figures 3, 6, 8 and 9 the box 38 is provided with an outwardly extending projection formed with a perforation, while the flange on the upper end of the socket 36 is provided with a similar projection 142 formed with a perforation, the arrangement being such that when the platform and jib structure have been swivelled so as to cause the jib structure to project laterally at right angles away from the side of the vehicle, the holes in the two projections 141 and 142 will be in register with each other so that they can receive a captive locking pin (not shown).

With the jib structure in its projecting position as described, the power unit 102 is started up and the collar 118 on the lay-shaft 110 is moved along this shaft by means of the hand-lever 120 so that its teeth 117 are brought into mesh with the teeth 116 in the hub of the sprocket wheel 114, thereby establishing a driving connection between this wheel and the lay-shaft. Where the power unit 102 includes a clutch, the collar 118 may be moved into driven connection with the sprocket wheel 114 before the power unit has been started up, the clutch of the power unit then being engaged.

The power unit acts to drive the conveyor 91, 92, 93 in a direction such that the upper run thereof moves away from the platform 40 towards the outer and upper end of the jib structure 55, the drive being transmitted from the pulley 103 on the power output shaft, through the belt 104, pulley 105, countershaft 106, sprocket wheel 109, drive chain 115, sprocket wheel 114, collar 118, lay-shaft 110, bevel wheels 122 and 123, shaft 124, bevel wheels 126 and 127, shaft 128, sprocket wheel 129, drive chain 130, sprocket wheel 131, shaft 54 and chain wheels 90.

Movement of the conveyor in the direction last stated causes the blades 133a on the rotor shaft 133 and the arms 138a on the rotor shaft 138 to rotate in correspondence with the direction of movement of the upper run of the conveyor, the rotor shaft 133 being driven from the shaft 128 through the sprocket wheel 136, chain 135 and sprocket wheel 134, while the rotor shaft 138 is driven from the shaft 88 through the sprocket wheel 137, chain 140 and sprocket wheel 139.

With the jib structure in elevated and laterally projecting position and the conveyor driven from the power unit 102 in the direction last described, bales are lifted one by one by hand from the tray of the transport vehicle 15 and pushed on to the platform 40. As each bale comes into contact with the rotor blades 133a of the shaft 133, these blades act to move the bale so that it comes into contact with and is engaged by the prongs 93 of the conveyor which thus acts to carry the bale from the platform upwardly towards the outer end of the jib structure 55. As the bale reaches the outer and upper end of the jib structure it is engaged by rotor arms 133a of the shaft 133 and these arms act to ensure disengagement of the bale from the prongs 93 so that the bale can readily be dragged away from the jib structure for stacking or storing.

During both elevation of the bales from the ground to the platform 40 in the picking up step, and elevation of the bales from the platform to the stacking or storing point, the fencing constituted in part by the bars 63 at the sides of the jib structure 55 acts to laterally confine the bales on the conveyor so that there is no risk of their falling over the side edges of the jib structure during their movement.

The implement illustrated includes means to prevent the bales from tumbling downwards while they are being elevated by the conveyor 91, 92, 93 either from the ground to the platform 40 or from the platform to the stacking or storing point. For this purpose, and as illustrated in Figures 10, 11 and 13, upwardly directed rods 143 are adjustably engaged in the upper ends of the tubes 61 situated nearest the outer end of the jib structure 55 and similar rods 143 are adjustably engaged in the upper ends of the tubes 61 situated nearest the inner end of the jib structure. Each pair of rods 143 is joined at the top by a transversely disposed cross-bar 144 and below the cross-bars there are provided transverse members 145 the outer ends of which are slidably engaged round the rods 143 so that the said members can move upwardly and downwardly. The transverse members 145 normally rest in a lower position on stops 146 provided on the rods 143 and are held resiliently in this position by buffer springs 147 arranged around the upper portions of the rods. The two transverse members 145 are connected together by a pair of longitudinally extending members 148, the end portions of which are curved upwardly as indicated at 148a To these portions there are secured pressure plates 149 the outer end portions of which are also curved upwardly.

When the jib structure 55 is in lowered position on the chassis 1 and the bales come into contact with the leading end of the conveyor 91, 92, 93 during the picking up step, the pressure plate 149 at the forward end of the jib structure will, under the influence of the corresponding buffer springs 147, bear resiliently on the upper surface of each bale and thus ensure firm engagement of the bale with the prongs 93. As the bale travels up the jib structure, this pressure will be continued by the longitudinally extending members 148 and then by the pressure plate 149 situated nearest the platform 40. The last-mentioned pressure plate 149 is so situated that the bale is relieved of downward pressure as soon as it reaches the entry edge of the platform so that the rotor blades 133a are free to release the bale from the prongs 93 and propel it on to the platform.

When the jib structure is in an upwardly inclined and laterally projecting position and bales placed on the platform 40 are pushed into contact with the conveyor during the stacking or storing step, the pressure-applying means constituted by the pressure plates 149, longitudinal members 148 and buffer springs 147, will act in much the same way as that described with reference to the picking up step.

In both instances the buffer springs 147 allow the pressure plates 149 and longitudinal members 148 to accommodate themselves to various sizes of bales so that there is always an assurance that the bales will be properly engaged by the prongs 93 and will be prevented from tumbling down the jib structure while they are being elevated. By varying the degree of engagement of the rods 143 in the tubes 61, the general level of the pressure-aplying means above the conveyor 91, 92, 93 can be adjusted according to requirements.

To further ensure proper engagement of the bales by the prongs 93 at the initiation of the picking-up step, and also to ensure proper presentation of the bales at the ending of the stacking or storing movement, the forward end of the jib structure 55 may be fitted with vertically disposed and forwardly extending cheek-plates 150, these plates being secured to and lying directly above the plates 83 and being also secured to the foremost tubes 61. The leading edge portions of these plates may be splayed outwardly as indicated at 150a.

The guide plate 50 carried by the post 42 on the platform 40 serves the purpose of affording some lateral guidance for the bales as they reach the platform during the picking-up step and move out of the confining influence of the railing bars 63. Further guidance in this respect is provided by a plate 151 (Figure 10) which is secured to the end of one of the railings nearest the platform on the same side as the plate 50.

The plates 50 and 151 are so dimensioned that when the jib structure is luffed upwardly in preparation for the stacking or storing step, the plate 50 will overlap the plate 151 as depicted in Figure 2, thereby affording guidance for one side of each bale as it is pushed along the platform 40 for engagement by the prongs 93 of the conveyor. The said plates also prevent loose ends of the hay in the bales from becoming badly entangled in the exposed gearing 129, 130, 131, 134, 135, and 136 between the platform 40 and the jib structure 55. Part of the said gearing may itself be protected by a cover plate indicated in dotted lines at 152 in Figure 7.

As depicted in Figure 4, instead of both ground wheels 14 being made fast with the live axle 13, one of these wheels may be mounted on the axle through the medium of a ratchet hub generally indicated at 153, this hub acting substantially in the manner of differential gearing enabling the implement to be steered and reversed without placing undue strain on the axle.

When the implement is being hauled over the ground to the place of use, the jib structure 55 will usually be placed in its lowered position and, prior to such haulage, the collar 96 on the live axle 13 and the collar 118 on the lay shaft 110 will both have been brought to their inoperative positions so that the conveyor 91, 92, 93 will also remain inoperative by being deprived of any driving connection with the live axle 13 or the power unit 102, it thus being possible to move the implement to the place of use with a minimum of effort.

What I do claim and desire to obtain by Letters Patent of the United States of America is:

1. For use in picking up and elevating hay bales and other packages, an implement comprising a chassis having ground engaging wheels, means for connecting the chassis to a transport vehicle, an upwardly extending column mounted rotatably on said chassis, a platform secured to the upper end of said column for rotation therewith, a jib structure pivotally connected at one end to said platform so that it can be luffed upwardly and downwardly and can also be swivelled as a result of rotation of said column and platform, means for applying a luffing movement to the jib structure, an endless conveyor supported for movement on the jib structure, first transmission connections, including a clutch, between at least one of the ground engaging wheels and said conveyor for driving the conveyor in one direction when the jib structure is in a downwardly luffed position, a power unit mounted on the chassis, and second transmission connections, including a clutch, between said power unit and the conveyor for driving the conveyor in the opposite direction when the jib structure is in an upwardly luffed position.

2. An implement in accordance with claim 1; wherein said ground engaging wheels are disposed at the rearward end of the chassis and including skid-shoes at the forward end thereof, so that the chassis is supported from the ground by the wheels and skid-shoes in combination.

3. An implement in accordance with claim 1; wherein said platform is provided with means acting to deflect the bales or other packages towards the transport vehicle as they are received by the platform from the conveyor.

4. An implement in accordance with claim 1 wherein; said platform carries a deflecting plate acting to deflect the bales or other packages towards the transport vehicles as they are received by the platform from the conveyor, said deflecting plate being pivotally supported on the platform so that it can be moved out of the way when not required for use.

5. An implement in accordance with claim 1; wherein said means for applying a luffing movement to the jib structure comprises an arm having one end pivotally connected to the rotatable column and the other end movably engaged with the jib structure, a winding roller rotatably supported on the jib structure, a cable connected to said other end of the said arm and also to the winding roller, and a hand-wheel for rotating the winding roller.

6. An implement in accordance with claim 1; further comprising a rotor at the free end of the jib structure, and means for rotating said rotor in either direction.

7. An implement in accordance with claim 1; further comprising a rotor mounted on the free end of the jib structure, and transmission connections from the endless conveyor to said rotor for rotating the latter in response to propulsion of the conveyor.

8. An implement in accordance with claim 1; further comprising a rotor between the platform and the end of the jib structure pivotally connected to the platform, and means for rotating said rotor in either direction.

9. An implement in accordance with claim 1; further comprising a rotor supported from the platform between the pivoted end of the jib structure and the platform, and transmission connections from the endless conveyor to said rotor for rotating the latter in response to propulsion of the conveyor.

10. An implement in accordance with claim 1; wherein the endless conveyor includes prongs and the jib structure is provided with resilient pressure means for maintaining the bales or packages in engagement with the said prongs while the bales or packages are being moved by the conveyor.

11. An implement in accordance with claim 1; wherein the chassis includes means for directing the bales or packages towards the endless conveyor when the jib structure is in a downwardly luffed position and the implement is hauled over the ground by a transport vehicle.

References Cited in the file of this patent

UNITED STATES PATENTS

| | | |
|---|---|---|
| 1,335,641 | Beardsley et al. | Mar. 30, 1920 |
| 2,312,779 | Smith | Mar. 2, 1943 |